United States Patent [19]

Strangfeld

[11] Patent Number: 4,676,477
[45] Date of Patent: Jun. 30, 1987

[54] SELF-CLOSING VALVE FITTING

[75] Inventor: Reiner Strangfeld, Bückeburg, Fed. Rep. of Germany

[73] Assignee: Georg Rost & Söhne Armaturenfabric GmbH & Co. KG, Porta Westfalica-Lerbeck, Fed. Rep. of Germany

[21] Appl. No.: 839,055

[22] Filed: Mar. 13, 1986

[30] Foreign Application Priority Data

Mar. 14, 1985 [DE] Fed. Rep. of Germany ....... 3509183

[51] Int. Cl.$^4$ .............................................. F16K 21/04
[52] U.S. Cl. ......................................... 251/15; 251/25
[58] Field of Search ....................... 251/15, 25, 35, 38, 251/39

[56] References Cited

U.S. PATENT DOCUMENTS 2,719,538 10/1955 Cole .................................... 251/38 X
2,758,811 8/1956 Peterson ........................... 251/38 X
4,577,829 3/1986 Strangfeld ............................. 251/15

FOREIGN PATENT DOCUMENTS 2946558 5/1981 Fed. Rep. of Germany ........ 251/38

Primary Examiner—Robert G. Nilson
Attorney, Agent, or Firm—Erwin S. Teltscher

[57] ABSTRACT

A self-closing valve fitting comprises a housing which bounds an internal space and includes a water inlet and a water outlet communicating with the internal space and a valve seat situated between the water inlet and the water outlet. A valve piston is received in the internal space for movement toward and away from the valve seat and for attendant cooperation with the valve seat. The valve piston delimits in the internal space, at a side thereof which faces away from the valve seat, a relief chamber. An actuation valve is arranged in the valve piston between the relief chamber and the water outlet and forms a part of an arrangement for self-retention of the fitting during a delayed opening movement of the valve piston. A deaeration member is arranged in the relief chamber and forms at a region of a jacket wall of the housing which circumferentially bounds the relief chamber at least one small flow-through passage which leads to the actuation valve. The deaeration member provides for a deaeration of the relief chamber even when the self-closing valve fitting is installed in a horizontal orientation.

6 Claims, 3 Drawing Figures

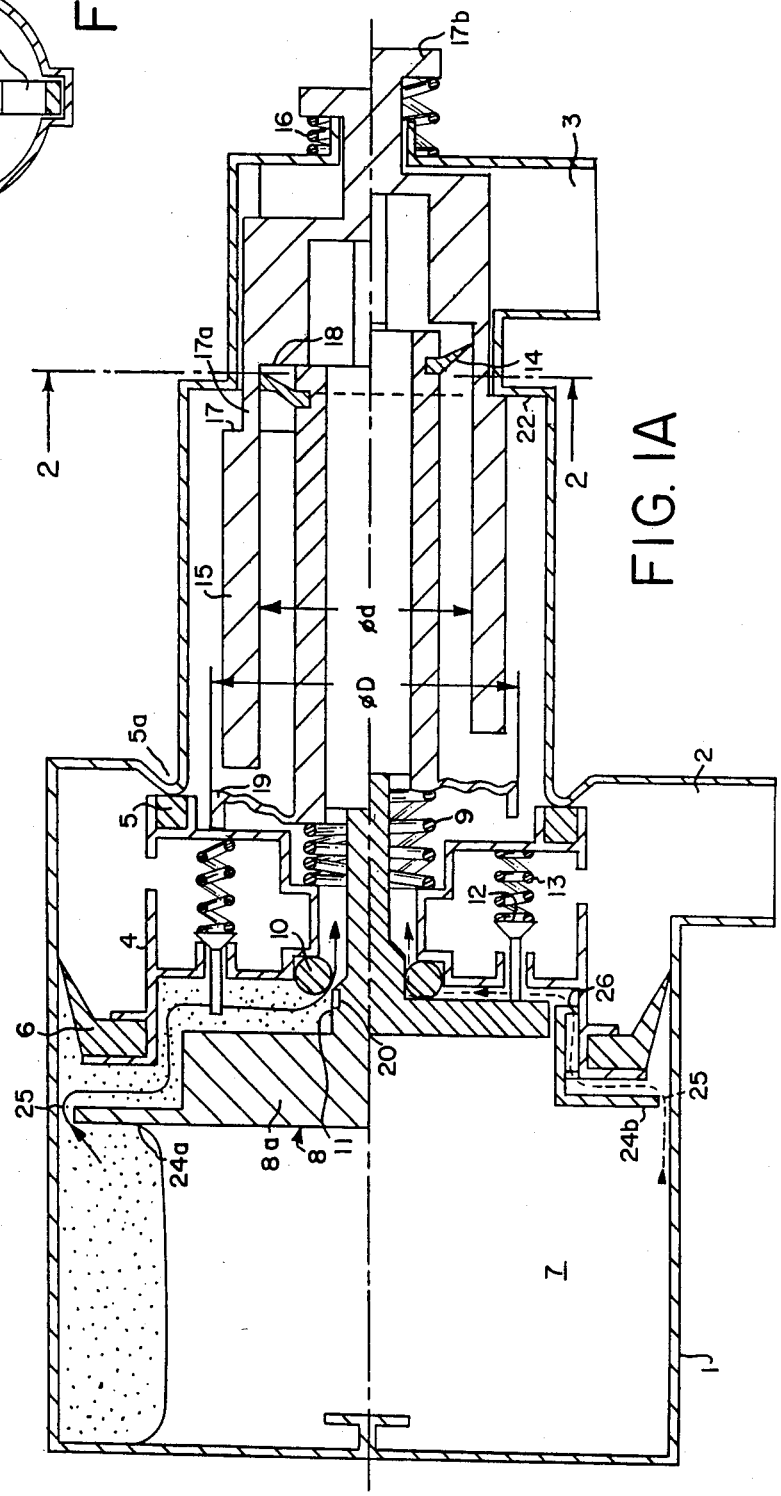
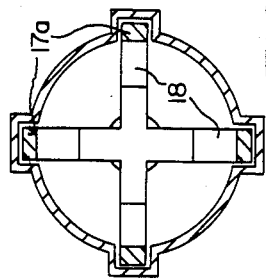
FIG. 2
FIG. 1A

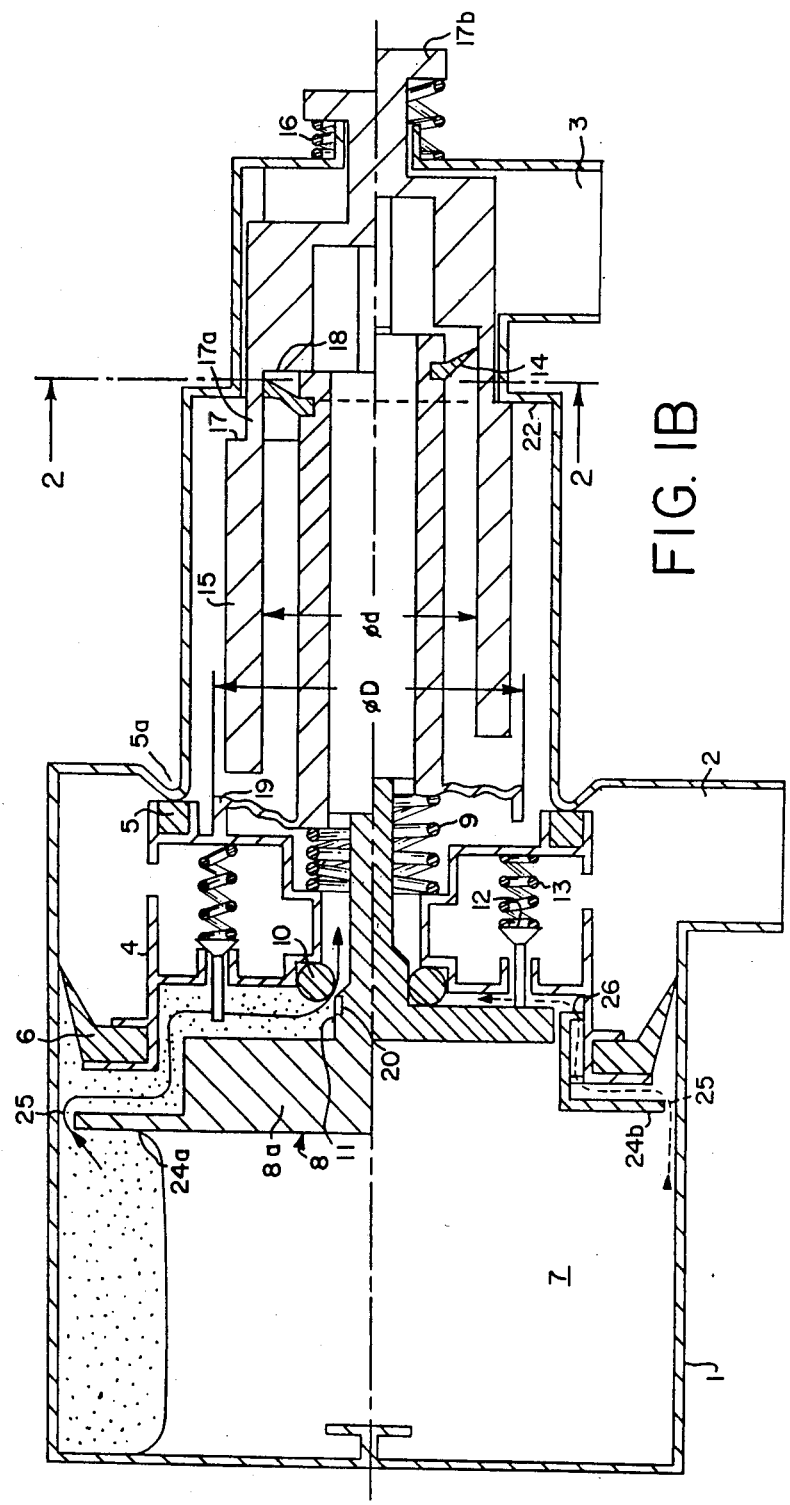

SELF-CLOSING VALVE FITTING

BACKGROUND OF THE INVENTION

The present invention relates to valve fittings in general, and more particularly to a self-closing valve fitting.

There are already known self-closing valve fittings in which a housing bounds an internal space and includes a water inlet and a water outlet which communicate with the internal space and a valve seat situated between the water inlet and the water outlet, and in which a valve piston is received in the internal space of the housing for movement toward and away from the valve seat and for attendant cooperation with the valve seat. The valve piston then delimits in the internal space, at its side which faces away from the valve seat, a relief chamber. In such known self-closing valve fittings, an actuation valve is arranged in the valve piston between the relief chamber and the water outlet and forms a part of an arrangement for self-retention of the fitting during a delayed opening movement of the valve piston.

In the self-closing valve fittings of this kind, air is naturally initially present in the self-closing valve fitting and especially also in the relief chamber during the first use of such fitting after its installation. Experience has shown that, in the self-closing valve fittings of the type here under consideration, because of the presence of the actuation valve which is built-in into the valve piston, there is not achieved a sufficient escape of the air contained in the relief chamber to the water outlet under certain circumstances, especially when such self-closing valve fitting is installed in a horizontal position. This is so because then a not inconsiderable air cushion is possibly collected at the upwardly situated region of the jacket wall bounding the relief chamber, without being able to escape from the relief chamber to the water outlet. However, such an air cushion remaining in the relief chamber can cause such an elastic behavior of the pressurized medium which is present in the relief chamber and which is constituted by the air cushion and the water, that an excessively wide opening of the valve piston occurs at the switching-on time. As a result of this, the self-holding action of the self-closing valve fitting can break down, since it is mechanically or hydraulically designed. Then, the actuation valve closes immediately and the valve piston also immediately returns into its position in which it engages its associated valve seat. This, of course, is very disadvantageous since it defeats the very purpose of the valve fitting.

SUMMARY OF THE INVENTION

Accordingly, it is an object of the present invention to avoid the disadvantages of the prior art.

More particularly, it is an object of the present invention to provide a self-closing valve fitting of the type here under consideration in which the danger of premature breakdown of the self-holding action during the first uses of the self-closing valve fitting following its installation is minimized if not avoided altogether.

Still another object of the present invention is to construct the self-closing valve fitting of the above type in such a manner as to assure rapid removal of air accumulated in the form of an air cushion in the relief chamber of the self-closing valve fitting.

In keeping with these objects and others which will become apparent hereafter, one feature of the present invention resides in a self-closing valve fitting which comprises a housing bounding an internal space and including a water inlet and a water outlet communicating with the internal space and a valve seat situated between the water inlet and the water outlet; a valve piston received in the internal space for movement toward and away from the valve seat and for attendant cooperation with the valve seat, the valve piston delimiting in the internal space, at a side of the valve piston which faces away from the valve seat, a relief chamber; an actuation valve arranged in the valve piston between the relief chamber and the water outlet and forming a part of an arrangement for self-retention of the fitting during a delayed opening movement of the valve piston; and a deaeration member arranged in the relief chamber and forming at least one small flow-through passage which leads to the actuation valve at the region of a jacket wall of the housing which circumferentially bounds the relief chamber.

The narrow flow passages which are formed by the deaeration member at the region of the jacket wall bounding the relief chamber over the circumference thereof and which lead to the actuation valve bring about, during the first use of the self-closing valve fitting after its installation but also later on, should air accumulate during the operation of the self-closing valve fitting over an extended period of time in the relief chamber, an extremely reliable escape of this accumulated air from the relief chamber to the water outlet immediately after the switching-on of the self-closing valve fitting. Namely, these narrow flow passages assure that, because of the much lower flow inertia of air in comparison to water, the air flows initially more quickly and preferentially from the relief chamber through the actuation valve to the water outlet due to the then existing pressure conditions. Even if a not yet sufficient escape of the air from the relief chamber occured during the first operation of the self-closing valve fitting after its installation, another operation attempt is usually sufficient to let the remaining air escape to the largest possible extent from the relief chamber, so that an extremely high operational reliability is achieved thereafter with respect to the maintenance of the self-holding action of the self-closing valve fitting during the retarded opening movement of the valve piston.

If, for any reason, there were a tendency for a small air cushion to accumulate again in the relief chamber over time during the operation of the self-closing valve fitting, this tendency would be avoided from the very outset for the above-mentioned reasons by the normal operation of the fitting with the attendant deaeration effect. The provision of the narrow flow passages at the region of the jacket wall of the relief chamber and over its circumference also assures that the deaeration effect occurs independently of the respective turned position of the fitting housing during the installation and use of the self-closing valve fitting. This is particularly important when, for instance, the fitting housing is integrated into a mixing valve and is mounted therein to be turnable as a whole so as to be able to change the water temperature.

A particularly advantageous construction of the self-closing valve fitting is obtained when the deaeration member forms an annular gap with the jacket wall of the relief chamber to serve as the flow-through passage. This, on the one hand, contributes to the reliability of the deaeration in any arbitrary position of the self-closing valve fitting and, on the other hand, renders possible realization possibilities for such a deaeration member which are simple in construction and easy to manufacture and install, especially also without requiring any significant structural changes in the available self-closing valve fitting construction.

According to another aspect of the present invention, the self-closing valve fitting further comprises a control tappet that is guided in the valve piston for axial movement and has a disk at its end which extends into the relief chamber, the deaeration member being then connected with the disk of the control tappet. In this connection, it is advantageous when the deaeration member is constituted by an annular flange-shaped extension of the disk of the control tappet. The deaeration member may be advantageously secured to the valve piston and may be constituted by a disk having a portion inserted into the valve piston and including ribs which support the disk on the valve piston.

BRIEF DESCRIPTION OF THE DRAWING

Further details of the self-closing valve fitting according to the present invention will become apparent from the following detailed description in conjunction with the accompanying drawings in which FIG. 1A shows a longitudinal section of the first embodiment of the invention:

FIG. 1B shows a longitudinal section of a second embodiment of the invention: and FIG. 2 is a section along line 2—2 of FIG. 1A.

DETAILED DESCRIPTION OF THE PREFERRED EMBODIMENT

Referring now to the drawing in detail, it may be seen that the reference numeral 1 has been used therein to identify a housing of a self-closing valve fitting. The housing 1 includes a water inlet 2 and a water outlet 3. A valve piston 4 is guided for displacement in the housing 1. The valve piston 4 carries a sealing element 5 which cooperates with a valve seat 5a which is provided on the housing 1 between the water inlet 2 and the water outlet 3. The valve piston 4 further delimits with the housing 1, at the side of the valve piston 4 which faces away from the valve seat 5a, a relief chamber 7. The valve piston 4 carries at its peripheral region a sealing gasket 6 which sealingly separates the relief chamber from the water inlet 2.

A control tappet 8 is mounted centrally of the valve piston 4 for movement axially with respect to the valve piston 4. The control tappet 8 cooperates by means of a shoulder 11 with an O-ring seal 10 which is carried by the valve piston 4, in order to form an actuating valve 10/11 for the self-closing valve fitting. A compression spring 9 urges the control tappet 8 into a closing position which is shown in the lower half of the drawing. In this closing position, the confinement of the O-ring seal 10 between the shoulder 11 and the valve piston 4 results in a sealing separation of the relief chamber 7 from the water outlet 3. Moreover, in this closing position of the control tappet 8, a disk 8a of the control tappet 8 also presses a tappet valve 12 against the biasing force of a compression spring 13 into its open position. As a result of this, the relief chamber 7 is in communication with the water inlet 2 in this closing position of the self-closing valve fitting.

The actuation valve 10/11, as well as the control tappet 8, are parts of an arrangement for exerting a self-holding action on the self-closing valve fitting during a retarded opening movement of the valve piston 4. In the example presented here, there is provided a hydraulic self-holding action. To this end, the control tappet 8 carries at one of its ends a throttling gasket seal 14. The outer edge of a lip of the throttling gasket seal 14 is received for a to-and-fro movement in an inner bore of a control sleeve 15, this inner bore having a diameter d. The control sleeve 15 is provided at one end of its cylindrical section with a shoulder 17. Commencing at the shoulder 17, the control sleeve 15 then extends in the axial direction in the form of four webs 17a which are arranged in a cross-shaped configuration. The webs 17a are guided in corresponding recesses provided in the housing 1 and define between themselves window-like openings through which water can flow in the corresponding operating position of the self-closing valve fitting to the water outlet 3. The webs 17a are then joined to an end plate. A pressure button 17b extends from an end face of this end plate which faces away from the webs 17a to the exterior of the housing 1. Herein, a compression spring 16 acts on the pressure button 17b and braces itself against the housing 1 at its end remote from the pressure button 17b. This pressure button 17b under normal circumstances holds the shoulder 17 of the control sleeve 15 in contact with a seating profile edge 22 which is provided on the housing 1.

The webs 17a are provided at their inner sides with projections 18 whose purpose is to act on the corresponding end of the control tappet 8. As a result of a stroke movement of the control tappet 8, the throttling gasket seal 14 slides, over a first displacement path section, on the one hand, along the webs 17a and, on the other hand, until the seating profile edge 22 of the housing outline is reached, on the housing 1.

The control tappet 8 carries, at a zone thereof which is situated outside the valve piston 4, but not yet in the control sleeve 15, a disk seal 19 which is flexible in the axial direction, this disk seal 19 having an outer diameter D. The control tappet 8 is further provided, at the region of a restriction which extends inwardly from the shoulder 11, with a small groove 20.

In this self-closing valve fitting, a deaeration member 24a or 24b is provided in the relief chamber 7. This dearation member 24a or 24b forms, at the region of the jacket wall of the relief chamber 7 and around the circumference of the relief chamber 7, narrow flow passages which lead to the actuation valve 10/11.

In the exemplary embodiment of the present invention which is illustrated in the upper half of the drawing, the disk 8a of the control tappet 8 which is situated in the relief chamber 7 is provided for this purpose with the enlargement or deaeration member 24a which forms an annular gap 25 with the jacket wall circumferentially bounding the relief chamber 7.

On the other hand, in another exemplary embodiment of the invention which is illustrated in the lower half of the drawing, there is provided as the deaeration member, and for forming of the flow passages leading to the actuation valve 10/11, the disk or deaearation member 24b which is pressed into the valve piston 4. For instance, the disk or deaeration member 24b is supported on the valve piston 4 by respective ribs 26. Here again, the peripheral edge of the disk member 24b forms the annular gap 25 with the jacket wall which circumferentially bounds the relief chamber 7.

Having so described the construction of the self-closing valve fitting of the present invention, the operation thereof in the region of interest here, as well as the function and operation of the deaeration members 24a or 24b, will be discussed below in conjunction with one another.

The self-closing valve fitting of the present invention is shown in the lower part of the drawing in its closed position. The valve piston 4 engages the valve seat 5a. The tappet valve 12 is maintained in its open position. The compression spring 9 urges the control tappet 8 into a position in which the actuation valve 10/11 is closed. The throttling gasket seal 14 is in a position in which it is clearly situated to the right and outwardly of the seating profile edge 22 as considered in the drawing.

When the pressure button 17b is pushed in against the force exerted thereon by the compression spring 16, then the control sleeve 15 is displaced in the leftward direction and, during this displacement, it also urges the control tappet 8 via the projection 18 in the leftward direction, so that the axially flexible disk seal 19 is sealingly pressed against the right-hand side of the valve piston 4. The shoulder 11 of the control tappet 8 is shifted as a result of this displacement relative to the O-ring seal 10 so that, during the normal operation of the self-closing valve fitting, the small groove 20 which acts as a nozzle lets water escape from the relief chamber 7. In view of the axial flexibility of the disk seal 19, the control tappet 8 can still be displaced further in the leftward direction, so that a larger flowthrough cross-sectional area is made available for the flow of water out of the relief chamber 7, as may be seen in the upper half of the drawing. Inasmuch as the water contents of the relief chamber 7 cannot now be replenished due to the now existing closed position of the tappet valve 12, the pressure from the water inlet 2 which acts on the right-hand side of the valve piston 4 lifts the valve piston 4 off the valve seat 5a. The piston diameter at its outer region is herein larger than the corresponding diameter at the region of the valve seat 5a.

As shown in the upper half of the drawing, the throttling gasket seal 14 is still situated during this initial phase of the lifting movement of the valve piston 4 to the right of and outwardly of the seating profile edge 22, so that the water from the water inlet 2 cannot flow in an unthrottled and unimpeded manner to the water outlet 3, even though the shoulder 17 of the control sleeve 15 has already been lifted off the seating profile edge 22 during this phase of the displacement. Rather, the water can only flow around the throttling gasket seal 14 after having deformed the throttling gasket seal 14 at its outer peripheral edge. In this manner, there is built up a pressure differential between the water inlet 2 and the water outlet 3. This pressure differential is effective in the leftward direction on the disk seal 19 and in the rightward direction on the throttling gasket seal 14. The different diameters D (outer diameter of the disk seal 19) and d (inner diameter of the control sleeve 15), in cooperation with the pressure differential between the two sides of the disk seal 19, have the effect that the control tappet 8 is pressed via its disk seal 19 in the leftward direction against the force of the compression spring 9. Herein, the throttling effect of the throttling gasket seal 14 is so chosen that the control tappet 8 is not completely displaced in the leftward direction. This means that, after the aforementioned initial phase of the opening, the relief chamber 7 does not remain open to the same extent as it was before; rather, the relief chamber 7 can now only be emptied through the groove 20 which acts as a nozzle. This results in the retarded opening movement of the valve piston 4, which constitutes the time-delay member of the self-closing valve fitting.

Inasmuch as, after the release of the pressure button 17b the pressure button 17b is again pressed by the compression spring 16 in the outward direction and thus the shoulder 17 of the control sleeve 15 is again caused to engage the seating profile edge 22 of the housing 1, water can further flow to the water outlet 3 only past the throttling gasket seal 14, so that the aforementioned pressure differential or the pressure difference is maintained during the now occurring slow further opening movement of the valve piston 4 and, in this manner, there is obtained the hydraulic self-holding action.

It follows from the above explanation that, if the valve piston 4 were opened excessively at the switching-on moment, the throttling gasket seal 14 would move in the leftward direction beyond the seating profile edge 22 and thus would immediately permit a bypass flow which would then propagate through the annular channel present between the housing 1 and the outer circumferential surface of the control sleeve 15. However, as a result of this bypass flow, the aforementioned pressure differentials, which provide for the hydraulic self-holding of the actuation valve in its open position in this exemplary embodiment of the present invention, would break down.

In a comparable manner, a breakdown of the self-holding action would also be encountered in a self-closing valve fitting with a mechanical self-holding action if a switching and control position were overshot at the switching-on moment by an excessively wide opening of the valve piston.

Such an excessively wide opening of the valve piston 4 at the switching-on moment could come into being if the pressure medium column in the relief chamber 7 exhibited a quasi-elastic behavior at the switching-on moment due to an excessively large compressibility of such medium. Such a condition can be encountered during the first use of a self-closing valve fitting of this type following installation. Under these circumstances, the self-closing valve fitting is initially filled only with air. Especially when the self-closing valve fitting is installed in a horizontal orientation, as it is shown in the drawing, it can happen that, after the first switching-on actuation, the air which is initially contained in the relief chamber 7 cannot escape to a sufficient degree from the actuation valve 10 and 11 to the water outlet 3. Rather, as indicated by stippling in the upper half of the drawing, a relatively voluminous air remainder bubble can remain in the then upper portion of the relief chamber 7, and this air remainder bubble can then result in the aforementioned elastic behavior. However, owing to the provision of the deaeration members 24a or 24b, which form the respective annular gaps 25 with the jacket surface bounding the relief chamber 7, it is assured that that the relief chamber 7 is rid of air even during the first use of the self-closing valve fitting after only one or at most after only a very few initial testing actuations, so that the self-holding action of the self-closing valve fitting can then be assured with a high degree of reliability.

It is indicated in detail in the exemplary embodiment of the present invention shown in the upper half of the drawing by the stippled region of the air bubble and a further stippled region, as well as an arrow leading toward the actuation valve 10/11 how the possibly present remaining air bubble can escape to the water outlet 3. This effect is accomplished in that water has a significantly higher inertia as far as its flow behavior is concerned than the trapped air so that initially, owing to the presence of the narrow annular gap 25, predominantly air begins to flow during the first use, based on the pressure conditions prevailing in the relief chamber 7, through the then easily opened actuation valve 10/11.

Similar conditions also obtain in the construction shown in the lower half of the drawing and including the deaeration member 24b in the form of an inserted disk. Then, the same effect as described before takes place at the then upper region of the annular gap 25. This is indicated in a dashed line in the lower half of the drawing. In order not to impair this effect, the outer circumferential surface of the end disk 8a of the control tappet 8 is received in the inserted disk member 24b with a minimum tolerance.

What is claimed is:

1. A self-closing valve fitting, comprising
  a housing bounding an internal space and including a water inlet and a water outlet communicating with said internal space and a valve seat situated between said water inlet and said water outlet;
  a valve piston received in said internal space for movement toward and away from said valve seat and for attendant cooperation with said valve seat, said valve piston delimiting in said internal space, at a side thereof which faces away from said valve seat, a relief chamber;
  an actuation valve arranged in said valve piston between said relief chamber and said water outlet and forming a part of an arrangement for self-retention of the fitting during a delayed opening movement of the valve piston; and
  a deaeration member arranged in said relief chamber and forming at the region of a jacket wall of the housing which circumferentially bounds said relief chamber at least one small flow-through passage which leads to said actuation valve.

2. The self-closing valve fitting as defined in claim 1, wherein said deaeration member forms an annular gap with said jacket wall of said relief chamber to serve as said flow-through passage.

3. The self-closing valve fitting as defined in claim 1; further comprising a control tappet which is guided in said valve piston for axial movement and has an disk at its end which extends into said relief chamber; and wherein said deaeration member is connected with said disk of said control tappet.

4. The self-closing valve fitting as defined in claim 3, wherein said deaeration member is constituted by an annular flange-shaped extension of said disk of said control tappet.

5. The self-closing valve fitting as defined in claim 1, wherein said deaeration member is secured to said valve piston.

6. The self-closing valve fitting as defined in claim 5, wherein said deaeration member is a disk having a portion inserted into said valve piston and including ribs which support said disk on said valve piston.

* * * * *

UNITED STATES PATENT OFFICE
CERTIFICATE OF CORRECTION

Patent No. 4,676,477           Dated  June 30, 1987

Inventor(s)  Reiner Strangfeld

It is certified that error appears in the above-identified patent and that said Letters Patent are hereby corrected as shown below:

Please delete Figs. 1A, 2, and Fig 1B as printed.

Please substitute Figs. 1A, 2 and 1B.

Signed and Sealed this

Twelfth Day of January, 1988

Attest:

DONALD J. QUIGG

Attesting Officer                Commissioner of Patents and Trademarks

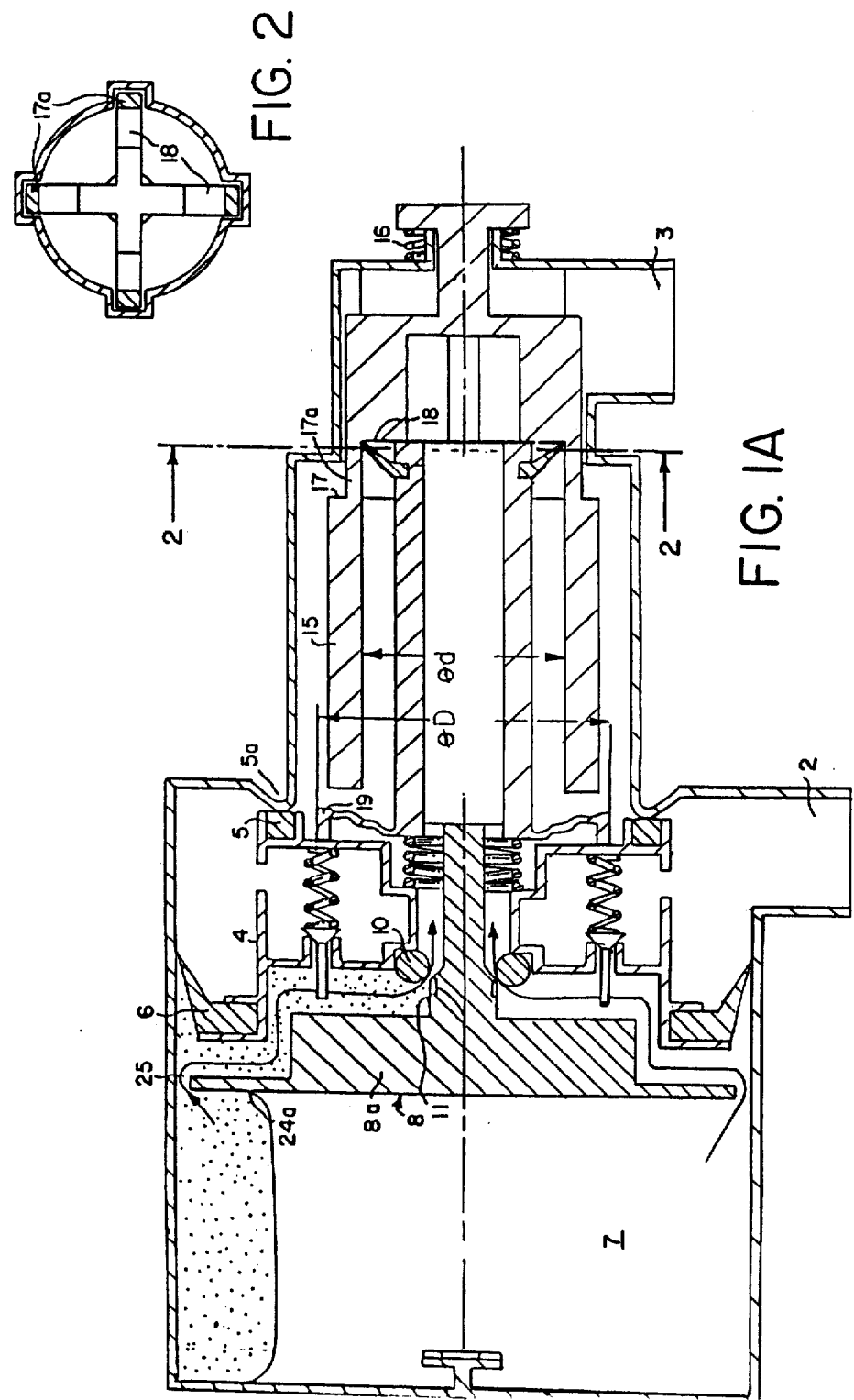

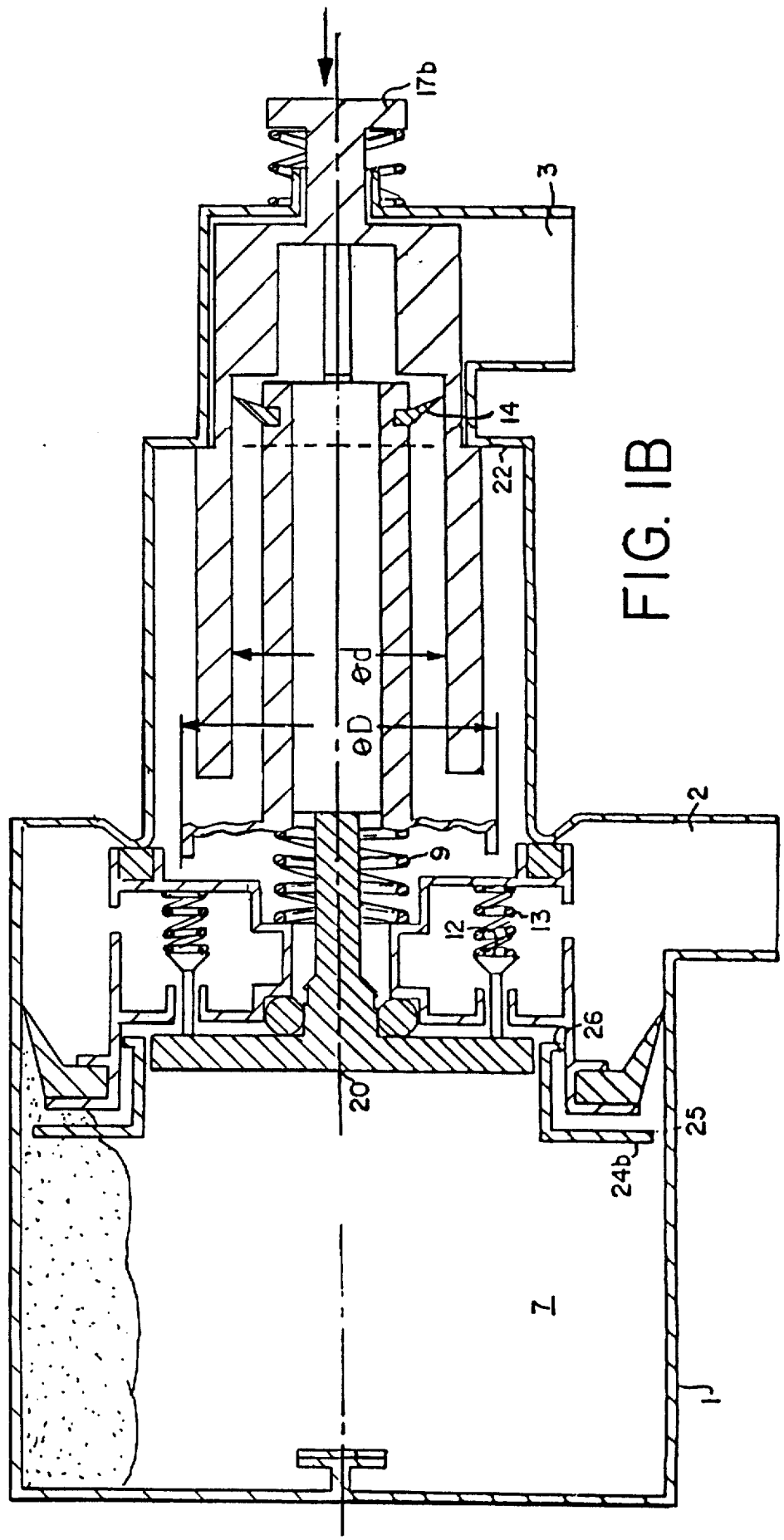
FIG. IB